United States Patent
Kim et al.

(10) Patent No.: US 10,043,235 B2
(45) Date of Patent: Aug. 7, 2018

(54) METHOD FOR CACHING GPU DATA AND DATA PROCESSING SYSTEM THEREFOR

(71) Applicant: Samsung Electronics Co., Ltd., Suwon-si (KR)

(72) Inventors: Cheolkyoo Kim, Yongin-si (KR); Kilwhan Lee, Seoul (KR); Yongha Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 437 days.

(21) Appl. No.: 14/539,609

(22) Filed: Nov. 12, 2014

(65) Prior Publication Data

US 2015/0221063 A1  Aug. 6, 2015

(30) Foreign Application Priority Data

Feb. 4, 2014  (KR) ........................ 10-2014-0012735

(51) Int. Cl.
*G06T 1/60* (2006.01)
*G06F 12/08* (2016.01)
*G06F 12/0862* (2016.01)

(52) U.S. Cl.
CPC ............ *G06T 1/60* (2013.01); *G06F 12/0862* (2013.01); *G06F 2212/455* (2013.01); *G06F 2212/6022* (2013.01); *Y02D 10/13* (2018.01)

(58) Field of Classification Search
None
See application file for complete search history.

(56) References Cited

U.S. PATENT DOCUMENTS

| | | | |
|---|---|---|---|
| 5,329,613 A | 7/1994 | Brase et al. | |
| 5,949,436 A * | 9/1999 | Horan ................ | G06F 12/1027 345/501 |
| 6,801,207 B1 * | 10/2004 | Tischler ............. | G06F 9/30181 345/503 |
| 7,336,284 B2 | 2/2008 | Morein et al. | |
| 7,348,988 B2 | 3/2008 | Xu | |
| 7,512,591 B2 | 3/2009 | Bildhaeuser et al. | |
| 7,539,602 B2 | 5/2009 | Willis | |
| 7,746,346 B2 | 6/2010 | Woo | |
| 8,022,960 B2 | 9/2011 | Yu | |
| 2003/0221072 A1 * | 11/2003 | Azevedo ............ | G06F 12/0862 711/154 |
| 2008/0091915 A1 * | 4/2008 | Moertl ................ | G06F 12/145 711/206 |

(Continued)

*Primary Examiner* — Maurice L McDowell, Jr.
*Assistant Examiner* — Donna J Ricks
(74) *Attorney, Agent, or Firm* — Onello & Mello, LLP (57) ABSTRACT

Provided are a multimedia data processing system and a selective caching method. The selective caching method in the multimedia data processing system includes inserting cacheability indicator information into an address translation table descriptor undergoing memory allocation to a graphics resource when the graphics resource needs to be cached and selectively controlling whether or not to prefetch multimedia data of the graphics resource present in a main memory to a system level cache memory, with reference to cacheability indicator information during an address translation operation of a graphic processing unit (GPU). The inventive concept can be implemented in a wide variety of computer-based systems having a graphical output, such as cell phones, laptops, tablets, and personal computers, as only a few examples.

16 Claims, 9 Drawing Sheets

(56) References Cited

U.S. PATENT DOCUMENTS

| | | | |
|---|---|---|---|
| 2012/0069029 A1* | 3/2012 | Bourd | G06F 9/546 345/502 |
| 2013/0111056 A1* | 5/2013 | Prasad | H04N 21/44209 709/231 |
| 2013/0159630 A1* | 6/2013 | Lichmanov | G06F 12/126 711/133 |
| 2013/0246708 A1* | 9/2013 | Ono | G06F 12/0862 711/122 |
| 2014/0002469 A1* | 1/2014 | Yonezawa | G06F 12/0875 345/557 |
| 2014/0149709 A1* | 5/2014 | Horman | G06F 12/023 711/170 |
| 2016/0328272 A1* | 11/2016 | Ahmed | G06F 9/4443 |

* cited by examiner

METHOD FOR CACHING GPU DATA AND DATA PROCESSING SYSTEM THEREFOR

CROSS-REFERENCE TO RELATED APPLICATIONS

This US non-provisional patent application claims priority under 35 USC § 119 to Korean Patent Application No. 10-2014-0012735, filed on Feb. 4, 2014, the entirety of which is hereby incorporated by reference.

FIELD OF INVENTION

The present disclosure relates to the field of multimedia data processing systems and methods and, more particularly, to a method for selectively caching GPU data in a system level cache memory and a data processing system therefor.

BACKGROUND OF THE INVENTION

In general, a data processing system includes at least one processor, known as a central processing unit (CPU). The data processing system may further include other processors used for various types of specialized processing, e.g., graphic processing unit (hereinafter referred to as "GPU"), which can also be referred to as a visual processing unit (VPU).

For example, a GPU can be a specialized electronic circuit that is designed to be suitable for graphical processing operations, and particularly for the rendering of graphical images. In general, the GPU includes a plurality of processing elements that are ideally suitable to execute the same command on parallel data streams, similar to data-parallel processing. In many general computer configurations, a CPU functions as a host or a control processor and hands off specialized functions to other, specialized processors, such as handing off graphics processing to a GPU.

In a three-dimensional (3D) graphics application, various types of resources are used to render a screen. Among GPU data input to a GPU, texture data and geometry data are important resources required to implement real-time photorealistic rendering on a computer display screen.

Advances in device display technology have led to steady increases in screen resolution. The amounts of texture data and geometry data used in real-time rendering are increasing in proportion to screen resolution size to meet a high-resolution display. As the amount of input GPU data increases, bandwidth increases between a GPU and a memory. Accordingly, a data processing system may additionally employ a system level cache (hereinafter referred to as "SLC") as one of methods for reducing memory traffic, other than an internal cache memory.

SUMMARY OF THE INVENTION

In accordance with aspects of the present inventive concept, provided is a method for processing GPU data and a data processing system configured to perform such a method.

In accordance with one aspect of the inventive concept, provide is a method for caching graphic processing unit (GPU) data in a multimedia processing system. In some embodiments, the method may include determining whether a graphics resource to be used in rendering needs to be cached in a system level cache memory, depending on a memory attribute of the graphics resource; inserting cacheability indicator information into an address translation table descriptor undergoing memory allocation to the graphics resource when the graphics resource needs to be cached; and selectively controlling whether or not to prefetch multimedia data of the graphics resource present in a main memory to the system level cache memory, with reference to (or as a function of) the cacheability indicator information during an address translation operation of the GPU.

In some embodiments, the memory allocation may be one of slab allocation, heap allocation, linear allocation, and coherency allocation.

In some embodiments, inserting the cacheability indicator information may be performed by a device driver operating in an operating system kernel mode.

In some embodiments, the system level cache memory may be shared by a central processing unit (CPU) and a plurality of multimedia image processors (IPs).

In some embodiments, the graphics resource may include at least one of texture data and geometry data.

In some embodiments, inserting the cacheability indicator information into the address translation table descriptor may be performed for intra-frame unit control in a frame of the multimedia data in real-time.

In some embodiments, inserting the cacheability indicator information into the address translation table descriptor may be performed for inter-frame unit control in units of frames of the multimedia data.

In some embodiments, the method can include limiting a caching operation of prefetching the multimedia data to the system level cache memory when a level 2 (L2) cache hit ratio to the multimedia data of the graphics resource in the GPU is higher than a set value.

In some embodiments, the method can include a performance monitor in the GPU periodically monitoring a shader core, a memory management unit, and a GPU L2 cache to check the cache hit ratio.

In accordance with one aspect of the inventive concept, provided is a data processing system. In some embodiments, the data processing system may include a central processing unit (CPU) on which an operating system and a device driver are loaded as programs; a graphic processing unit (GPU) including a level 2 (L2) cache memory; and a system level cache memory mounted outside the GPU and shared by the CPU. The device driver can be configured to determine whether a graphics resource to be used in rendering needs to be cached in the system level cache memory, depending on a memory attribute of the graphics resource. The device driver may also be configured to insert cacheability indicator information undergoing address allocation to the graphic resource into an address translation table descriptor when a result of the determination is that the graphics resource needs to be cached. The GPU may also be configured to selectively control whether or not to prefetch multimedia data of the graphics resource present in a main memory to the system level cache memory, with reference to the cacheability indicator information inserted into the address translation table descriptor when a virtual address of the GPU is translated into a physical address.

In some embodiments, the GPU may further include a performance monitor, a shader core, and a memory management unit configured to check a cache hit ratio of the L2 cache memory and to generate cache control information.

In some embodiments, inserting the cacheability indicator information into the address translation table descriptor may be performed for intra-frame unit control in a frame of the multimedia data.

In some embodiments, the performance monitor may be configured to monitor the shader core, the memory management unit, and the L2 cache memory in real-time during the intra-frame unit control to prefetch the multimedia data to the system level cache memory when a L2 cache hit ratio of the GPU to the multimedia data of the graphic resource is lower than a set value.

In some embodiments, inserting the cacheability indicator information into the address translation table descriptor may be performed for inter-frame unit control in units of frames of the multimedia data.

In some embodiments, during the inter-frame unit control, the performance monitor collects and evaluates information on a counting value and an operating cycle in the GPU obtained after rendering a single frame and stores the collected and evaluated information in a special function register of the GPU. During the inter-frame unit control, the device driver referencing the information stored in the special function register may be configured to change information of a cacheability attribute descriptor register that the memory management unit references before starting to render a next frame.

In accordance with one aspect of the inventive concept, provided is a method of caching graphic processing unit (GPU) data in an apparatus having a multimedia processing system. The method comprises providing a central processing unit (CPU), a main memory, and a system level cache (SLC) memory external to a GPU; a device driver of the CPU initializing cacheability indicator information to a set of control values; a performance monitor of the GPU monitoring a shader core, a memory management unit (MMU), and a level 2 (L2) cache memory of the GPU to update in real-time the cacheability indicator information; and the device driver selectively controlling whether or not to prefetch multimedia data of a graphics resource present in the main memory to the SLC memory, based on the cacheability indicator information during an address translation operation of the GPU.

In some embodiments, the CPU, SLC memory, and GPU can be components of a system on a chip (SoC).

In some embodiments, the method can further comprise the performance monitor checking a cache hit ratio of the L2 cache memory to update the cacheability indicator information.

In some embodiments, the method can further comprise inserting the cacheability indicator information into an address translation table descriptor undergoing memory allocation to the graphics resource when the graphics resource needs to be cached.

In some embodiments, inserting the cacheability indicator information can be performed by the device driver while operating in an operating system kernel mode.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain principles of the disclosure. In the drawings.

DETAILED DESCRIPTION

Example embodiments of systems, methods, and/or devices in accordance with aspects of the inventive concept will now be described in relation to the accompanying drawings. However, the disclosure is not limited to such embodiments, and may be embodied in other forms.

It will be understood that when an element is referred to herein as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

Moreover, the same or like reference numerals in each of the drawings represent the same or like components, if possible, unless otherwise indicated. In some drawings, the connection of elements and lines is represented to effectively explain technical content and may further include other elements or circuit blocks. It will be understood by those skilled in the art that circuits shown herein may include other elements in addition to those depicted in the drawings.

Note that each embodiment that is herein explained and exemplified may also include its complementary embodiment and the details of basic data access operations, a calculation operation, and internal software on a GPU are not described in order not to make the subject matter of the disclosure ambiguous.

Figure 1:
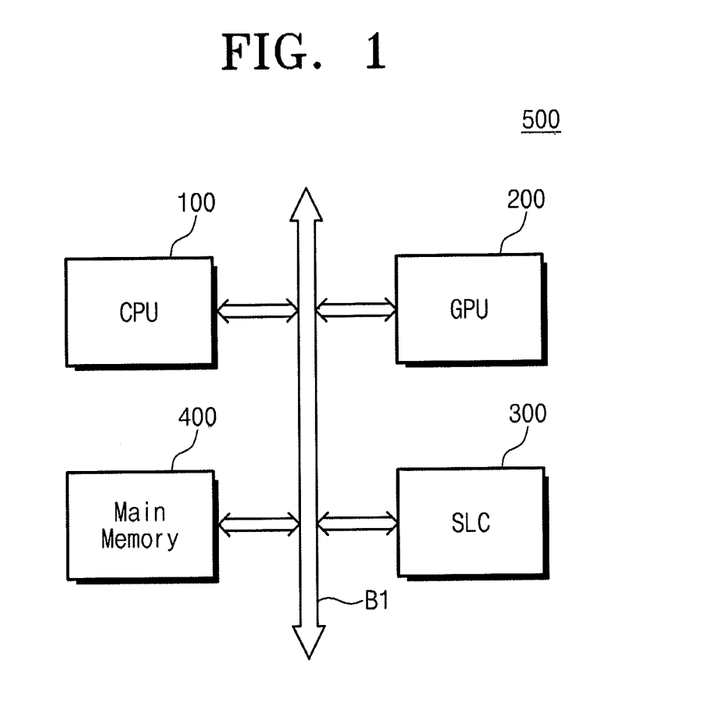
FIG. 1 is a schematic configuration block diagram of an embodiment of a data processing system, according to aspects of the inventive concept.

FIG. 1 is a schematic configuration block diagram of an embodiment of a data processing system 500 according to the aspects of the inventive concept. As illustrated, the data processing system 500 may include a central processing unit (CPU) 100, a graphic processing unit (GPU) 200, a main memory 400, and a system level cache (SLC) memory 300. The main memory 400 may be connected to the CPU 100 via a memory bus B1, for example.

The SLC memory 300 is connected to the CPU 100 and the GPU 200 through the system bus B1. The SLC memory 300 is commonly employed in a system-on-chip (SoC) system. That is, although a cache memory, e.g., level 2 (L2) cache memory is present inside the GPU 200, the SLC memory 300 shared by the CPU 100 and GPU 200 is useful to overcome a deficiency or need for memory bandwidth. As a result, use of the SLC memory is required because GPU data, such as multimedia data, needs greater memory bandwidth than other data.

A three dimensional (3D) graphics pipeline of the GPU 200 may process vertex attribute, shader program, texture, and program context information. A shader program may be embodied in a computer program of the GPU that is used to do shading. A vertex attribute may be embodied in a data structure that describes certain graphical attributes, such as a position of a point in 2D or 3D space. The program context information is information related to the particular context implemented by the GPU.

Various efforts have been made to achieve improved processing capability and lower power consumption of GPU data in a GPU architecture. A method of reducing memory latency using a texture cache and an L2 cache inside a GPU is known as one of the efforts.

In terms of power consumption, it is advantageous to employ an SLC memory shared by many multimedia image processors (IPs) including a GPU and a CPU in a SoC system, due to bandwidth reduction effect, rather than to increase capacity of an internal cache of the GPU.

If a consistent prefetch scheme is applied to all graphics resources, i.e., all GPU data, when the SLC memory 300 is used, GPU performance may be degraded due to cache thrashing effects. That is, use efficiency of the SLC memory 300 may be degraded when all GPU resources are cached in the SLC memory 300 having limited capacity.

Therefore, when efficiency of an SLC memory is estimated in real-time to selectively control caching of GPU data, improvement of GPU performance and low power consumption may be achieved. Among resources of a GPU, specific graphic resources advantageous in reduction of memory bandwidth need to be cached in the SLC memory 300. On the other hand, caching graphic resources of a high accuracy rate in the SLC memory 300 may be limited even with an internal cache of the GPU. In that case, a cache area of the SLC memory 300 may be provided to other resources of the GPU or may be used by multimedia image processors (IPs) in the system.

The data processing system 500 embodiment in FIG. 1 may implement a schema for caching or non-caching GPU data in the SLC memory 300 according to a memory attribute of one or more graphics resources.

Graphics applications have been diversified into, for example, 3D game, 3D user interface, arcade game, navigation system, and the like. The usage of graphics resources may vary depending on types of applied graphics applications. As a result, specific graphics resources advantageous in reduction of memory bandwidth of the GPU 200 are cached in the SLC memory 300, while graphics resources having high caching efficiency are only cached in the internal cache of the GPU 200, so need not be cached in the SLC memory 300.

In particular, if a determination is made on whether 3D graphics resources having a high cache efficiency are cached in the SLC memory among GPU data used for rendering, after the 3D graphics resources are estimated between frames or in a frame, improvement of GPU performance and lower power consumption are achieved.

Figure 2:
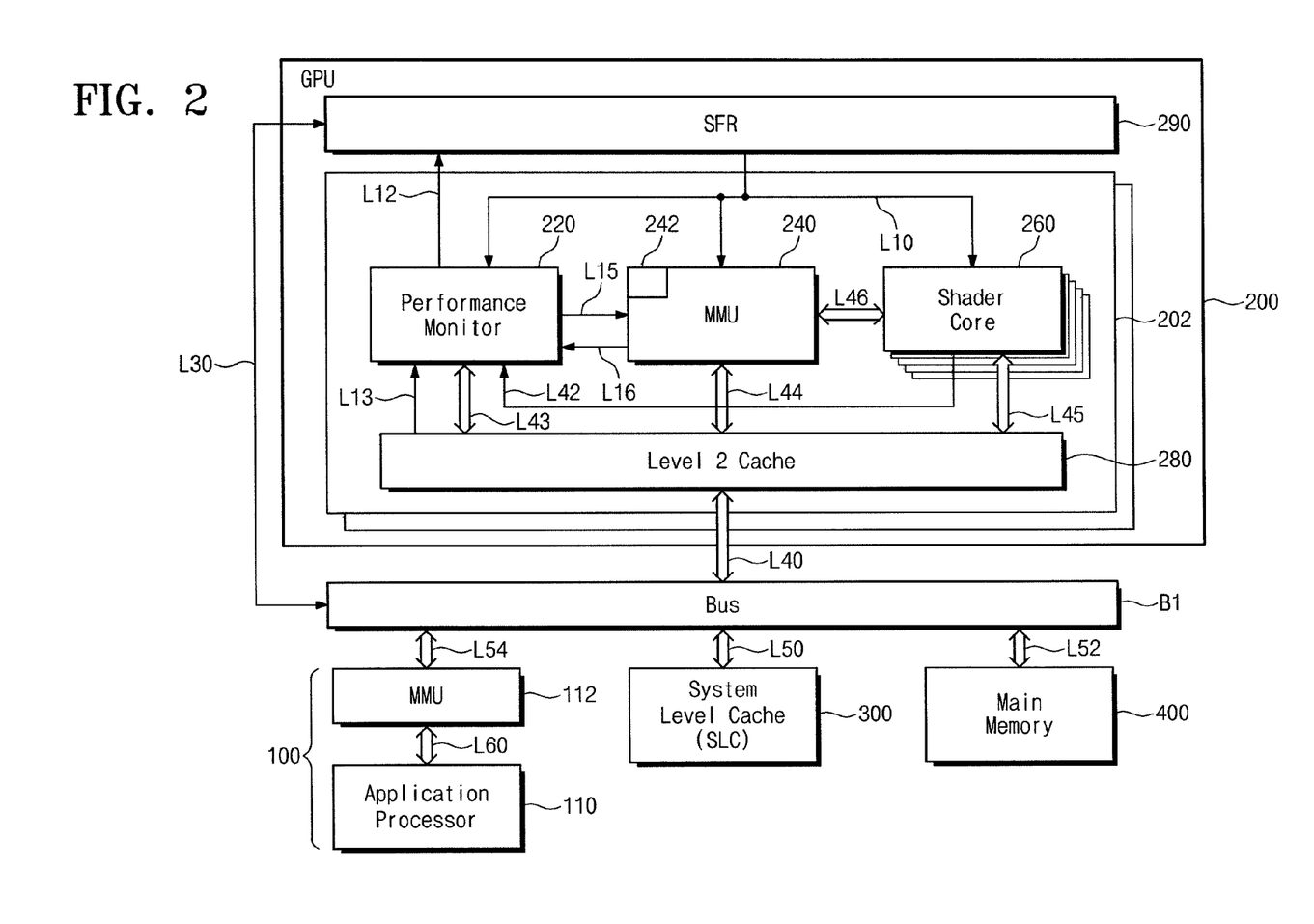
FIG. 2 is an exemplary detailed configuration block diagram of an embodiment of the data processing system of FIG. 1, according to aspects of the inventive concept.

FIG. 2 is an exemplary detailed configuration block diagram of an embodiment of the data processing system of FIG. 1. As illustrated, the GPU 200 may include a performance monitor 22Q, a memory management unit (MMU) 240, a shader core 260, a level 2 (L2) cache memory 280, and a special function register 290 as a hardware block. The performance monitor 220 monitors the shader core 260, the MMU 240, and the L2 cache memory 280 in real-time. Counter information and cycle information referenced and managed by the performance monitor 220 are present in the shader core 260, the MMU 240, and the L2 cache memory 280. The performance monitor 220 exchanges control data with the MMU 240 through lines L15 and L16 and receives state information of the L2 cache memory 280 through a line L13, wherein a "line" may represent any typical circuit-level communication path. The performance monitor 220 receives state information of the shader core 260 through a line L42. The performance monitor 220 provides the counter information and the cycle information to the special function register 290 through a line L12.

The MMU 240 in the GPU 200 manages whether or not to fetch multimedia data of a graphics resource resident in the main memory 400 to the system level cache (SLC) memory 300. That is, GPU data resident in the main memory 400 may be selectively prefetched to the SLC memory 300, according to a memory attribute, by the MMU 240, which is driven under the control of the a device driver that can be embodied in software. A cacheability attribute descriptor register 242 referenced during address translation may be included in the MMU 240.

The shader core 260 may internally have a texture cache, a load/store cache, a vertex cache, and a shade program cache for processing graphics data in the form of modules. As a result, counter information present in these cache memories can be monitored by the performance monitor 220. The shader core 260 can be connected to the MMU 240 through a line L46 and controlled by the special function register 290 through a line L10.

A shader program is executed through the shader core 260 for rendering 3D graphics on a display screen, i.e., the shader core is used to render a 3D model (object to be drawn on a screen). The term "rendering" is a generic term for processes of converting a 3D object into a 2D object, e.g., a process of deciding a color value for a pixel. Thus, as used herein, the word "rendering" means a procedure or technique of producing realistic 3D images in a 2D image, such as on or in a display screen, considering shade, color, concentration, and the like that vary depending on external information such as shape, location, and lighting. That is, the "rendering" is a computer graphical procedure in which a two-dimensionally shown object obtains a three-dimensional effect through change of shade or concentration to add reality.

A vertex shader, a pixel shader, and a geometry shader are representative shaders that can be used in various graphics libraries (e.g., OpenGl and DirectX). The vertex shader is used to transform a vertex's 3D position in virtual space to the 2D coordinate at which it appears on the screen. The vertex shader can manipulate properties such as position, color and texture coordinate, so can be used to adjust a polygon position, as an example. A polygon has one or more vertices, and shading is performed as many as the number of the vertices, e.g., once per vertex. As a result, the vertex shader is used to give a special effect to an object by mathematically calculating vertex information of the object. Each vertex is defined by various manners. Vertex information includes, for example, x-y-z coordinates indicating three-dimensional position, color, texture coordinate, lighting information, and the like. The vertex shader may change a value of the vertex information to move an object to a special position, to change a texture, or to change a color.

The pixel shader is also referred to as a fragment shader and is used to compute and output a pixel color. Since pixel shading is performed as many as the number of pixels occupying an area, a relatively long time may be taken by the pixel shader. The geometry shader is used to create or remove a figure, and tessellation is implemented by the geometry shader. But in other embodiments, a separate tessellation shader may be provided. The geometry shader program is executed after the vertex shader program and has a function to create a point, a line, and/or a figure, such as triangle, that cannot be created by the vertex shader. The geometry shader program receives figure information coming through the vertex shader. For example, when three vertices enter the geometry shader, the geometry shader may remove all of the vertices or may create and put out more figures. As a result, the geometry shader is mainly used to render tessellation or shade effect and a cube map through one-time processing.

The shader calling order is as follows: vertex shader→geometry shader→pixel shader. In the presently preferred embodiment, it is essential to call the vertex shader and the pixel shader. The processing amount of the geometry shader is as much as the number of polygons, the processing amount of the vertex shader is as much as the number of vertices forming a polygon, and the processing amount of the pixel shader is as much as the number of pixels.

The special function register 290 is configured to allow the device driver to control the performance monitor 220. To enable this control, the system bus B1 is connected to the special function register 290 through a line L30 and the special function register 290 is connected to the performance monitor 220 through a line L10. The device driver may store caching attribute information that may be formatted and stored as a cacheability attribute descriptor, and may also change the caching attribute information in real-time according to a data processing state of a GPU 200. The performance monitor 220 stores counter information and cycle information, obtained by referencing the shader core 260, memory management unit (MMU) 240, and L2 cache memory 280, in the special function register 290. As a result, the device driver may control the performance monitor 220, which is a hardware block in this embodiment, through the special function register 290.

The L2 cache memory 280 may function as an internal cache of the GPU 200. The L2 cache memory 280 is connected to the MMU 240 through a line L44 and connected to the system bus B1 through a line L40. The L2 cache memory 280 is connected to the performance monitor 220 through a line L13 and connected to the shader core 260 through a line L45.

An application processor 110 to drive an operating system, a device driver, and an application program are connected to the system bus B1 through the MMU 112, and the MMU 112 is connected to the system bus B1 through a line L54. The application processor 110 and the MMU 112 may be configured and/or initialized by the CPU 100 in FIG. 1.

The system level cache memory 300 is connected to the system bus B1 through a line L50. Data storage capacity of the system level cache memory 300 may be set to be greater than that of the L2 cache memory 280.

A main memory 400 is connected to the system bus B1 through a line L52. The main memory 400 may be a DRAM or an MRAM, as examples. The main memory 400 is accessed by the CPU 100 and the GPU 200.

Figure 3:
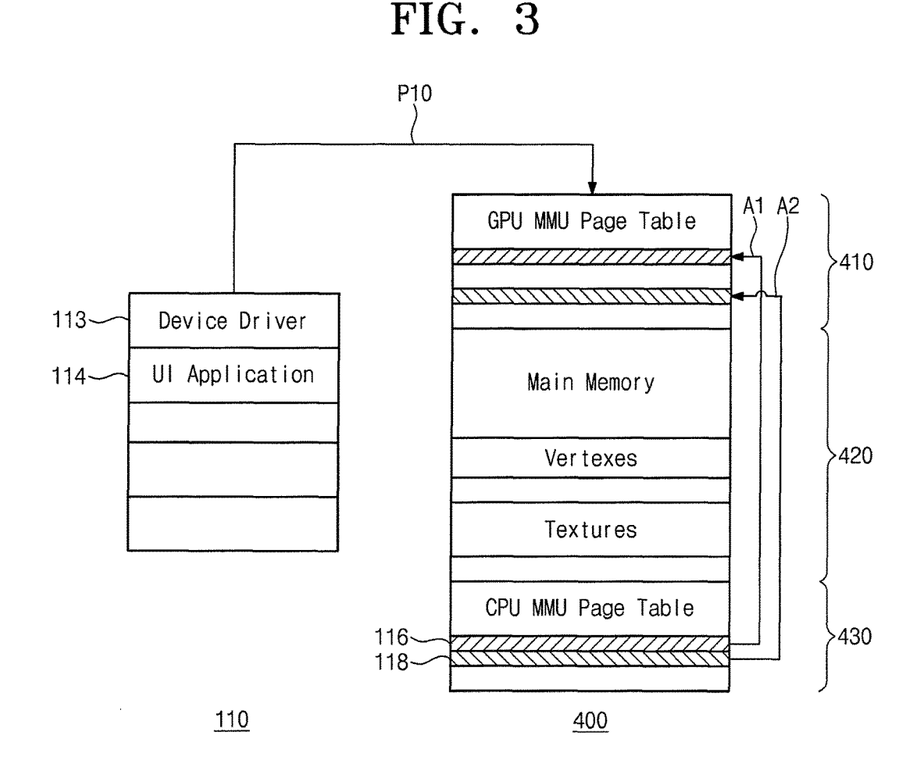
FIG. 3 is an exemplary block diagram illustrating an embodiment of an approach for loading GPU data into a main memory as in FIG. 2, according to aspects of the inventive concept.

FIG. 3 is an exemplary block diagram illustrating an embodiment of an approach for loading GPU data into the main memory 400 in FIG. 2. Referring to the embodiment of FIG. 3, GPU data loaded to the main memory 400 by a device driver 113 of the application processor 110 is schematically shown.

The device driver 113 of the application processor 110 is a graphics driver configured to drive the GPU 200 and is implemented using software or firmware.

A UI application 114 of the application processor 110 means a user interface application.

The main memory 400 includes page table regions 410 and 430 functioning as an address translation table and a data storage region 420. The GPU MMU page table region 410 is referenced by an MMU 240 in the GPU 200. The CPU MMU page table region 430 is referenced by an MMU 112 in the CPU 100. A page table entry associated with vertex data 116 and texture data 118 is stored in the CPU MMU page table region 430, and the MMU 112 in the CPU 100 may confirm the entry content with reference to an index where the page table is taken from a virtual address. A physical address assigned to a corresponding virtual address may be confirmed when the entry content is referenced.

When the device driver 113 of the application processor 110 processes the vertex data of the main memory 400 through a line P10 in FIG. 3, an entry is added to the GPU page table region 410 of the vertex data 116 based on the CPU page table region 430 of the vertex data, as indicated by an arrow A1. When the entry is added to the GPU page table region 430 as indicated by the arrow A1, vertex data may be copied from a storage region of the main memory 400 to a storage region of the main memory 400 allocated to the GPU. When the vertex data stored in the storage region of the main memory 400 is shared by the CPU and the GPU, only entry information may be updated in the GPU page table region 410.

In addition, an entry is added to the GPU page table region 410 of the texture data 118 based on the CPU page table region 430 of the texture data 118, as indicated by an arrow A2. When the entry is added to the GPU page table region 410 as indicated by the arrow A2, texture data may be copied from a storage region of the main memory 400 to a storage region of the main memory 400 allocated to the GPU. When the texture data stored in the storage region of the main memory 400 is shared by the CPU and the GPU, only entry information may be updated in the GPU page table region 410.

In various embodiments of the inventive concept, cacheability indicator information (CII) is referenced in an address translation operation mode of a GPU to effectively cache GPU data loaded to the data region 420 of the main memory 400 in an SLC memory 300 in FIG. 2.

Figure 4:
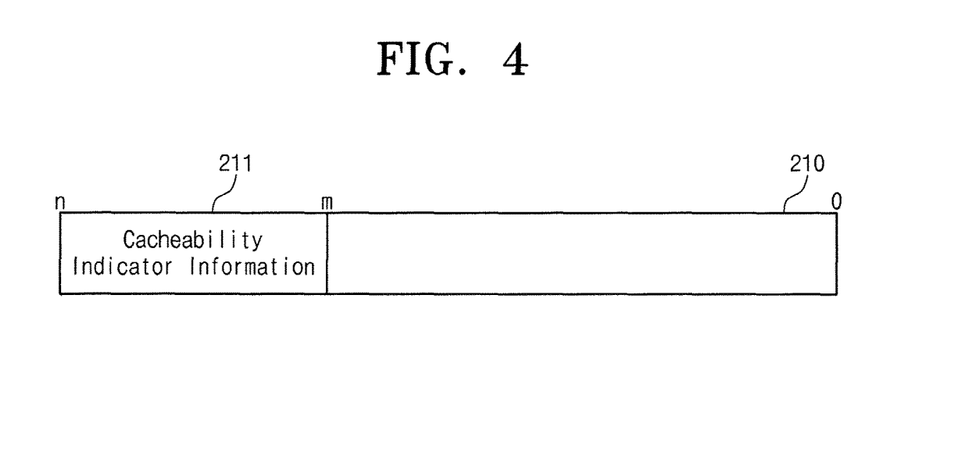
FIG. 4 is an exemplary diagram of an embodiment of an address translation table descriptor referenced when an address is translated by a GPU as in FIG. 2, according to aspects of the inventive concept.

FIG. 4 is an exemplary diagram of an embodiment of an address translation table descriptor referenced when an address is translated by a GPU in FIG. 2. As illustrated, the address translation table descriptor includes a physical address region 210 for address translation and a cacheability indicator information (CII) region 211 according to an embodiment of the inventive concept.

Cacheability indicator information stored in the cacheability indicator information region 211 may be designated by the device driver 113. The device driver 113 decides whether graphics resources to be used in rendering, e.g., rendering display images, need to be cached in the system level cache memory 300, depending on a memory attribute of the graphics resources.

The address translation table descriptor in FIG. 4 is referenced by the MMU 240 in the GPU 200. The cacheability indicator information CII may be stored in reserved bit regions (n to m) in the address translation table descriptor.

Figure 5:
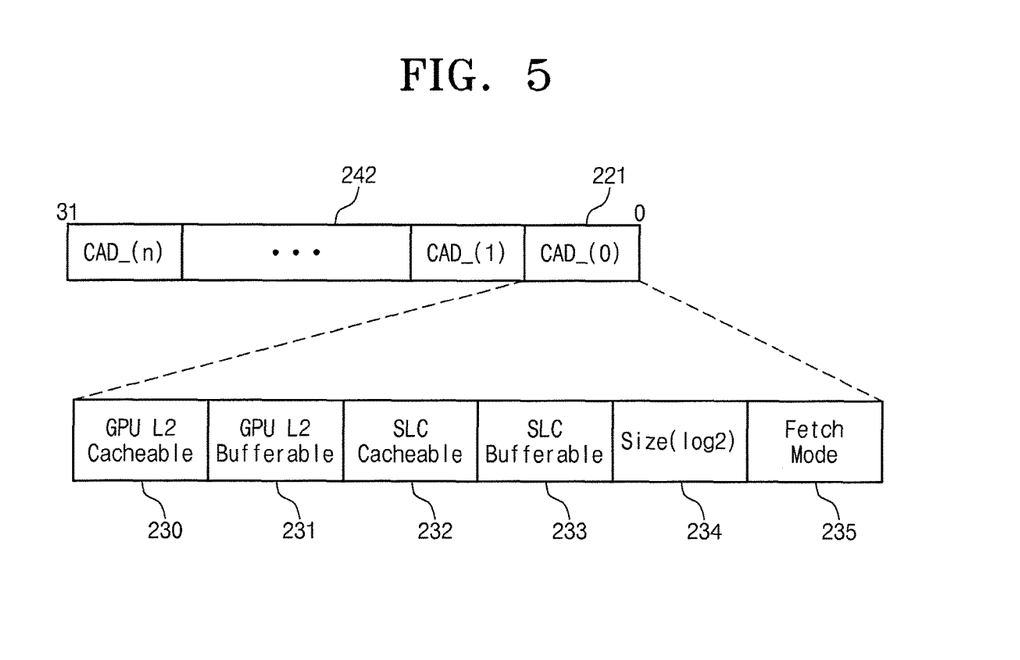
FIG. 5 is a configuration diagram of an embodiment of a cacheability attribute descriptor register for operating the GPU in FIG. 2, according to aspects of the inventive concept.

FIG. 5 is a configuration diagram of an embodiment of a cacheability attribute descriptor register 242 for operating the GPU 200 in FIG. 2. As illustrated, the cacheability attribute descriptor register 242 may include a plurality of cacheability attribute register (CAD) regions 221. The CAD regions 221 in the cacheability attribute descriptor register 242 are referenced by the MMU 240 in FIG. 2. A single CAD region 221 may include a plurality of fields 230, 231, 232, 233, 234, and 235. The CAD regions 221 may be individually allocated according to memory attributes of graphics resources (e.g., texture, buffer, shader constant buffer, etc.). The CAD regions 221 may increase to the number required to express graphics resources.

The fields 230 and 231 are associated with the control of the L2 cache 280 in the GPU 200.

The fields 232 and 233 are associated with the control of the SLC memory 300.

The field 234 indicates a size of data to be prefetched to the SLC memory 300. The field 235 is a fetch mode field indicating a prefetch operation mode.

The device driver 113 allows control data for cacheable or bufferable control to be stored in the CAD regions 221 in FIG. 5 through an SFR 290.

Figure 6:
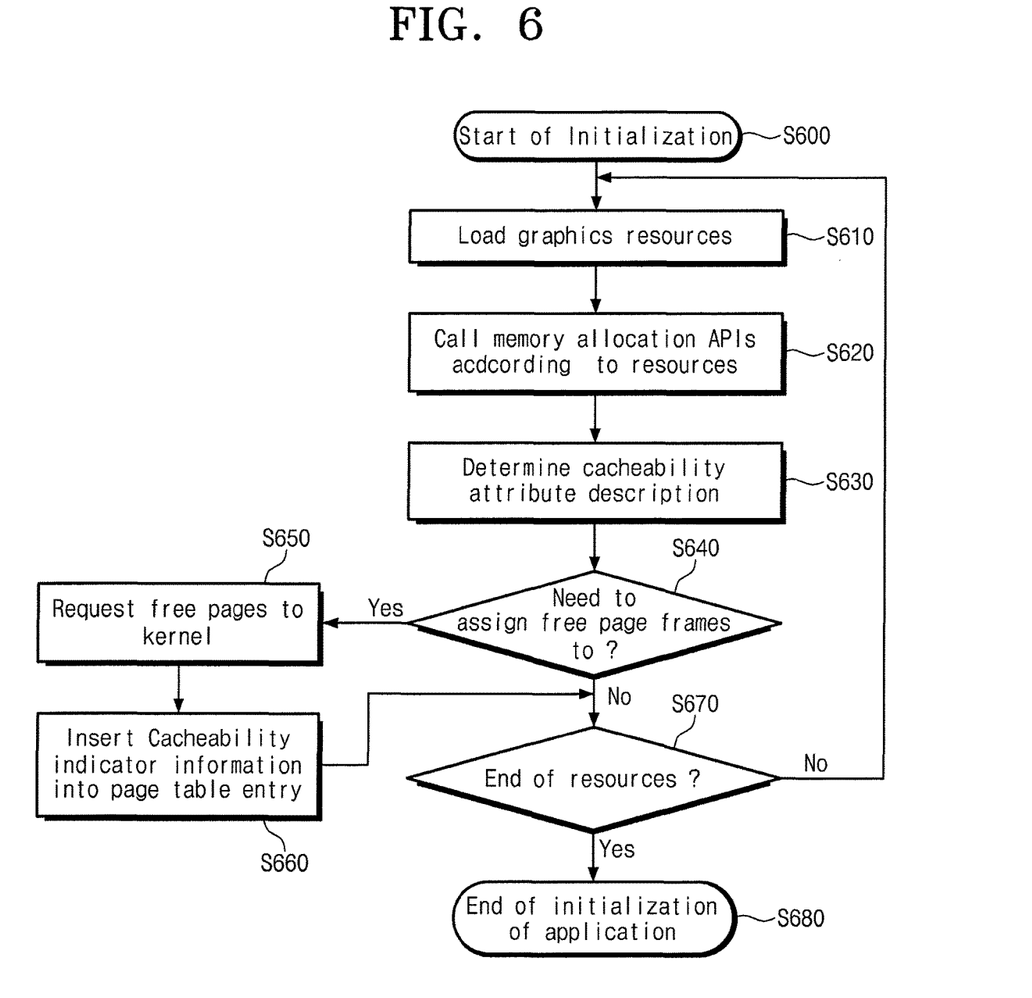
FIG. 6 is an initialization operation flowchart of an embodiment of a device driver method for configuring FIGS. 4 and 5, according to aspects of the inventive concept.

FIG. 6 is an initialization operation flowchart depicting an embodiment of a method that can be used by the device driver 113 for configuring the features of FIGS. 4 and 5.

If an initialization operation starts (S600), the CII 211 in FIG. 4 is initialized, and graphics resources start to be loaded to the main memory 400 (S610). The loading operation of the graphics resources is the same as described with reference to FIG. 3. Memory allocation APIs are called according to the graphics resources (S620). The term "API" is an abbreviation for "Application Programming Interface" that is a function published to use functions of an operating system. Since programs run on an operating system, functions of the operating system must be used. In such a way, an API is used to call the functions of the operating system. As a result, a graphics library calls a memory allocation function of a device driver for graphics resources that need memory allocation. The term "memory library" means a collection of functions created for graphics that are used in association with the graphics.

The CAD 221 described with reference to FIG. 5 is determined (S630). The device driver 113 sets control data in the CAD 221 to predetermined control values when the initial operations in FIG. 6 are performed.

Checking is performed to determine whether free page frames need to be assigned (S640). That is, checking is performed to determine if a memory needs to be newly allocated to new graphics resources. If the memory needs to be newly allocated (S640), the flow proceeds to S650 in which free pages are requested from a kernel of an operating system (OS). Following S650, the flow proceeds to S660 in which cacheable indicator information (CII) is inserted into the CII region 211 of the address translation table descriptor as flag information.

Checking is performed to determine whether there are additional graphics resources. If there are additional graphics resources, the flow returns to S610. If there are no additional graphics resources, the flow proceeds to S680 in which the initialization is completed.

Once the initialization operation in FIG. 6 is completed, the device driver 113 may check the performance monitor 220 to control caching in the SLC memory 300 in real-time.

Figure 7:
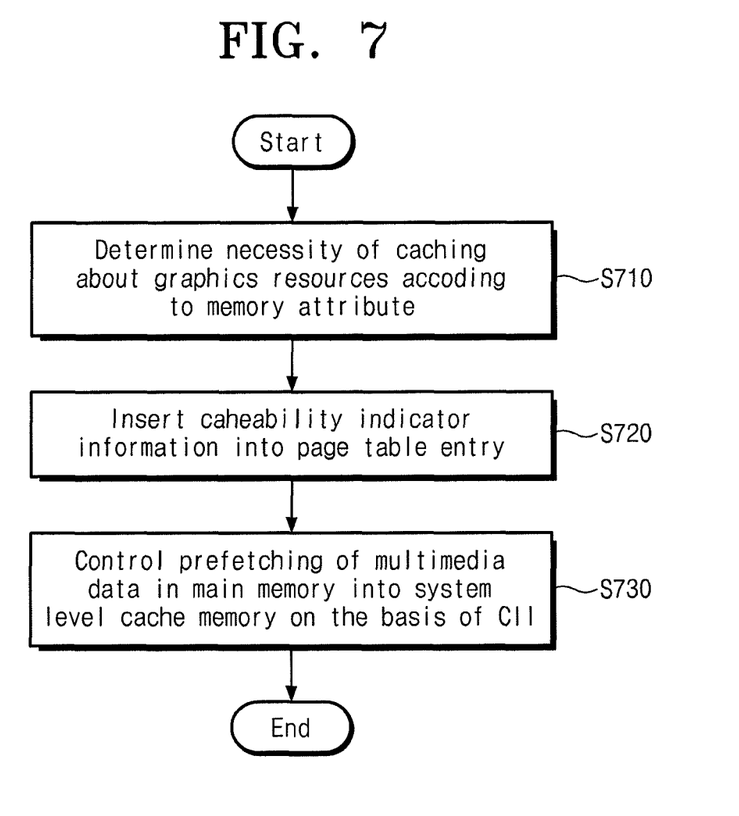
FIG. 7 is an embodiment of an operation flowchart illustrating a method by which the data processing system in FIG. 2 selectively caches GPU data, according to aspects of the inventive concept.

FIG. 7 is an operation flowchart illustrating an embodiment of a method that can be used by the data processing system in FIG. 2 to selectively cache GPU data.

Referring to the embodiment of FIG. 7, determination is made as to whether graphics resources to be used in rendering need to be cached in a system level cache memory, depending on memory attributes of the graphics resources (S710).

An embodiment of memory allocation of graphics resources is now described, in accordance with aspects of the inventive concepts. A memory allocation function of a device driver (113) operating in a kernel region is served through an API provided from a graphics library (e.g., OpenGLES, OpenGL, Direct 3D, etc.) to register graphics data that an application program uses. That is, the device driver 113 is allocated with a memory from an operating system according to resource attributes received from a library callee.

The memory allocation is roughly classified into four types, such as slab allocation, heap allocation, linear allocation, and coherency allocation. Allocable memory attributes are distinguished using the four types of allocation methods and flag parameter indicating memory attributes. For example, as a representative type, there is a region that only a CPU can access, a region that is used by a GPU that a CPU can also access, and a region that is mainly used by a GPU, but that a CPU can also access, if necessary. Attributes of graphics resources required for rendering may be decided according to life time and read/write characteristics. The phrase "life time" means time between allocation and deallocation of graphics resources.

If graphics resources need to be cached, cacheable indicator information is inserted into an address translation table descriptor where a memory is allocated to the graphics resources (S720). Thus, the CII 211 in FIG. 4 is stored in the address translation table descriptor.

The flow proceeds to S730 to selectively control whether or not to prefetch multimedia data of the graphics resources present in a main memory 400 to the system level cache memory 300, which may be carried out in real-time in units of inter-frames or intra-frames.

A procedure in which the GPU 200 in FIG. 2 efficiently uses the SLC memory 300 will now be described below.

An application program primarily requests allocation of a memory space for storage of a defined graphics resource; where the request is made to a kernel of an operating system (OS) through a graphics library and a device driver.

The device driver (e.g., device driver 113) stores cacheability indicator information (CII) in an address translation table descriptor (211) for a memory space allocated from the kernel in the form of an index.

An MMU 240 in a GPU 200 refers to CAD in FIG. 5 corresponding to the cacheability indicator information (CII) when a virtual address of data to be processed is translated into a physical address, such as the CII stored in the address translation table descriptor 211. The MMU 240 applies control information for caching a graphics resource from the main memory 400 to an SLC memory 300.

The multimedia data of the graphics resource(s) may undergo SLC cacheability control in units of intra-frames or inter-frames.

Infra-frame SLC cacheability control will now be described below.

The performance monitor 220 in the GPU 200 refers to and manages counter information and cycle information of the shader core 260, the MMU 240, and the GPU L2 cache 280.

The MMU 240 in the GPU 200 controls prefetch of GPU data. That is, GPU data resident in the main memory 400 may be prefetched to the SLC memory 300 by the control of the MMU 240.

The performance monitor 220 monitors the shader core 260, the MMU 240, and the GPU L2 cache 280 in real-time. The performance monitor 220 may periodically monitor counter information that may be present in each of texture cache, load/store cache, vertex cache, and shader program cache.

A size of prefetch to the SLC is controlled to increase with respect to a demand for a graphics resource where a cache miss ratio of the L2 cache 280 is greater than a predetermined threshold, where a cache miss indicates that called data is not stored in the L2 cache 280.

A cacheability attribute of the L2 cache 280 is maintained with respect to a graphics resource where a cache hit ratio of the L2 cache 280 is high, but use of the SLC memory 300 is limited. A cache hit occurs when called data is stored in the L2 cache 280. That is, among attributes of an associated resource descriptor of CADR, an SLC control bit value (e.g., field 232 in FIG. 5) is converted from cacheable to non-cacheable or otherwise stored to indicate non-cacheable. As a result, a right to access another graphics resource is given, and GPU performance is enhanced. A configuring method and the referencing of the CAD 221 in FIG. 5 may vary depending on system configuration and an L2 size and a sub-cache inside a GPU.

Next, inter-frame SLC cacheability control will now be exemplarily described below.

Inter-frame SLC cacheability control is conducted after a single frame is evaluated. For example, when there are first and second frames adjacent to each other, let it be assumed that a first frame is referred to as a current frame and the second frame is referred to as a next frame. Counter information and cycle information of the shader core 260, the MMU 240, and the GPU L2 cache 280 obtained after rendering the first frame are collected and evaluated by the performance monitor 220. The device driver 113 may confirm the counter information and the cycle information through an SFR 290. A graphics resource, which needs to use the SLC memory 300 before starting to render the second (or next) frame, is decided. As a result, the device driver corrects CAD regions of the CADR 242 in FIG. 5, based on the counter information and the cycle information obtained from the performance monitor 220.

In this case, there is a limitation in SLC caching of resources of an application program which satisfies minimum frame per second (FPS) that graphics application programs require. Thus, when an SLC is yielded to be used by other processors, an effect of reducing memory bandwidth is obtained in the overall system.

As a result, a counting value in the GPU and information on operating cycle obtained after rendering a single frame are collected and evaluated to be stored in a special function register of the GPU 200 during inter-frame unit control, according to an embodiment of the inventive concept.

The device driver 113 referencing the information stored in the special function register changes information stored in the cacheability attribute descriptor register (CADR 242) referenced by the memory management unit (MMU) 240 before rendering the next frame, enabling caching into the SLC memory 300 to be efficiently performed in real-time.

Figure 8:
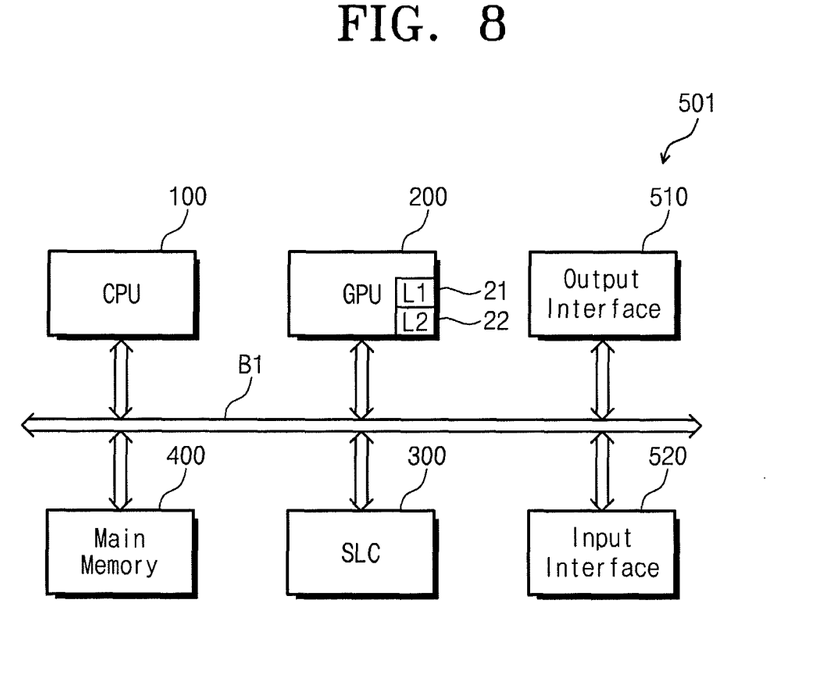
FIG. 8 is a schematic configuration block diagram of an alternative embodiment of a data processing system according of FIG. 1, according to aspects of the inventive concept.

FIG. 8 is a schematic configuration block diagram of an embodiment of a data processing system 501 as a modification of the embodiment of FIG. 1, in accordance with aspects of the inventive concept. As illustrated, the data processing system 501 may include a CPU 100, a GPU 200, a main memory 400, a system level cache memory 300, an output interface 510, and an input interface 520.

The configuration in FIG. 8 is identical to the system configuration in FIG. 1, apart from the output and input interfaces 510 and 520.

The GPU 200 includes an L1 cache memory 21 and an L2 cache memory 22.

The input interface 520 may include various devices to receive a signal from an external entity, e.g., module, system or subsystem, program, process, or the like. The input interface 520 may include a keyboard, a keypad, a button, a touch panel, a touch screen, a touch pad, a touch ball, a camera including an image sensor, a microphone, a gyroscope sensor, a vibration sensor, a data port for wired input, an antenna for wireless input, and the like.

The output interface 510 may include various devices to output a signal to an external entity. The output interface 510 may include a liquid crystal display (LCD), an organic light emitting diode (OLED) display, an active matrix OLED (AMOLED) display, an LED, a speaker, a motor, a data port for wired output, an antenna for wireless output, and the like.

An interface between the CPU 100 and the input interface 520 includes various protocols for data communication. For example, the various protocols may include at least one of USB (Universal Serial Bus) protocol, MMC (Multimedia Card) protocol, PCI (Peripheral Component Interconnection) protocol, PCI-E (PCI-Express) protocol, ATA (Advanced Technology Attachment) protocol, SATA (Serial ATA) protocol, ESDI (Enhanced Small Disk Interface) protocol, and IDE (Integrated Drive Electronics) protocol.

The data processing system 501 in FIG. 8 may further include a nonvolatile storage capability or device other than the main memory 400.

The nonvolatile storage may be implemented using a flash memory, a magnetic random access memory (MRAM), a spin-transfer torque MRAM, a conductive bridging RAM (CBRAM), a ferroelectric RAM (FeRAM), a phase change RAM (PRAM) which is also called an ovonic unified memory (OUM), a resistive RAM (RRAM or ReRAM), a nanotube RRAM, a polymer RAM (PoRAM), a nano floating gate memory (NFGM), a holographic memory, a molecular electronics memory device or an insulator resistance change memory.

Figure 9:
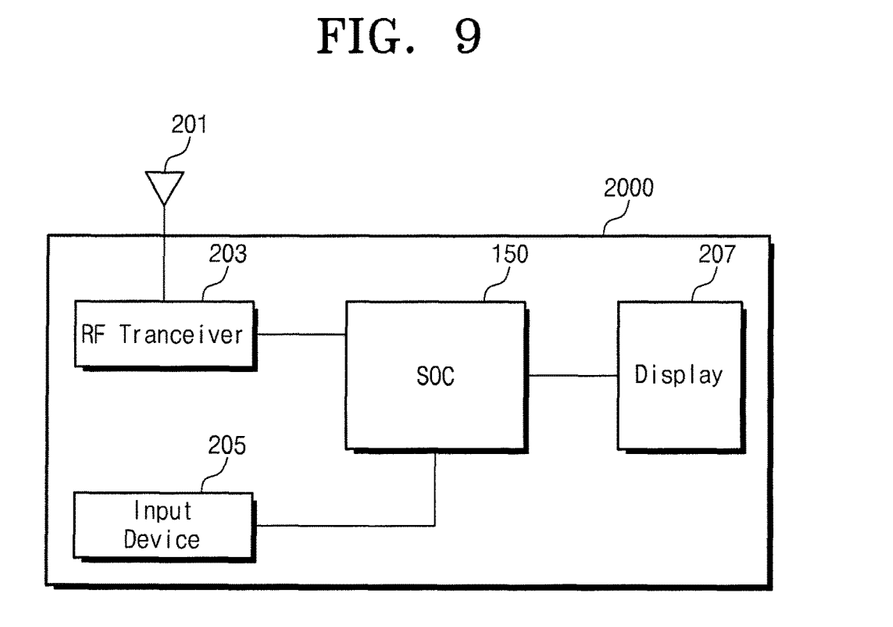
FIG. 9 is a block diagram illustrating an embodiment of an application of the inventive concept applied to a mobile system including a system on a chip (SOC), according to aspects of the inventive concept.
Figure 10:
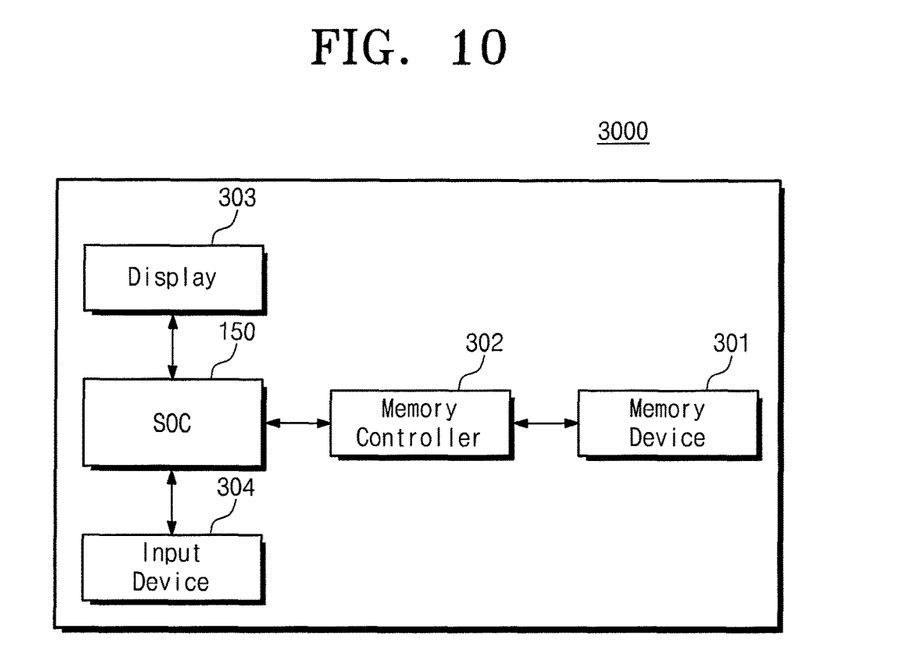
FIG. 10 is a block diagram illustrating an embodiment of an application of the inventive concept applied to a digital electronic device, according to aspects of the inventive concept.
Figure 11:
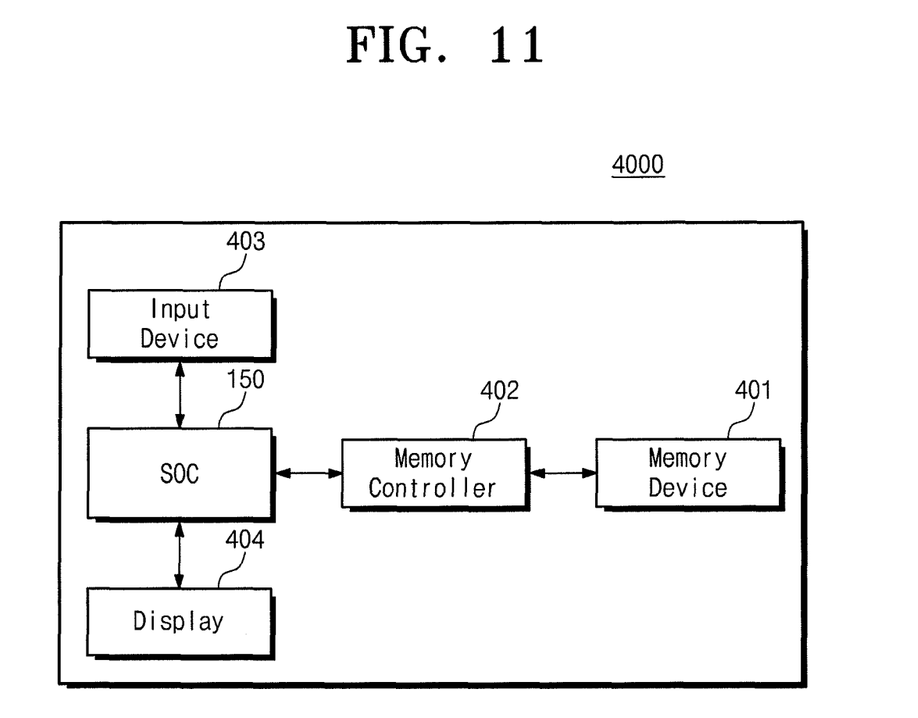
FIG. 11 is a block diagram illustrating an embodiment of an application of the inventive concept applied to another digital electronic device, according to aspects of the inventive concept.

FIGS. 9 through 11 show various exemplary embodiments of systems and devices that can implement the graphics processing, graphics information memory and cache control and management described above with respect to the embodiments of FIGS. 1 through 8, where a GPU uses an SLC memory with greater efficiency, including reduced memory traffic.

FIG. 9 is a block diagram illustrating an embodiment of an application of the inventive concept applied to a mobile system 2000 including an SOC, according to aspects of the inventive concept. As illustrated, the mobile system 2000 may include a SoC 150, an antenna 201, an RF transceiver 203, an input device 205, and a display 207.

The RF transceiver 203 may transmit or receive an RF signal through the antenna 201. For example, the RF transceiver 203 may convert an RF signal received through the antenna 201 into a signal that may be processed in the SoC 150.

Thus, the SoC 150 may process a signal output from the RF transceiver 203 and transmit the processed signal to the display 207. In addition, the RF transceiver 203 may convert a signal output from the SoC 150 into an RF signal and output the converted RF signal to an external device through the antenna 201.

The input device 205 may input a control signal to control the operation of the SoC 150 or may input data to be processed by the SoC 150. The input device 205 may be implemented using a pointing device, such as a touch pad, a computer mouse, a keypad or a keyboard.

Since the mobile system 2000 in FIG. 9 may include the SLC memory 300 incorporated in the SoC 150, performance of the mobile system 2000 may be enhanced.

FIG. 10 is a block diagram illustrating an embodiment of an application of the inventive concept applied to a digital electronic device 3000, according to aspects of the inventive concept. The digital electronic device 3000 may be implemented using a personal computer (PC), a network server, a tablet PC, a net-book, an e-reader, a personal digital assistant (PDA), a portable multimedia player (PMP), an MP3 player or an MP4 player, or any other handheld or portable electronic device.

The digital electronic device 3000 may include a SoC 150, a memory device 301, a memory controller 302 to control a data processing operation of the memory device 301, a display 303, and an input device 304. The digital electronic device 3000 may also include an antenna for wireless communication and/or data ports for wired communication.

The SoC 150 receives input data through the input device 304. Data stored in the memory device 301 may be displayed through the display 303 according to control and processing operations of the SoC 150. For example, the input device 304 may be implemented using a pointing device such as a touch pad, a computer mouse, a keypad, or a keyboard. The SoC 150 may control the overall operation of the data processing system 3000 and control the operation of the memory controller 302.

In various embodiments, the memory controller 302 used to control the operation of the memory device 301 may be implemented as a part of the SoC 150 or may be implemented separately from the SoC 150.

Since the digital electronic device 3000 in FIG. 10 may selectively cache data of a GPU in an SLC memory, operation performance of the digital electronic device 3000 may be enhanced.

The digital electronic device 3000 in FIG. 10 may be applied to one of an ultra mobile PC (UMPC), a workstation, a net-book, a personal digital assistant (PDA), a web tablet, a wireless phone, a mobile phone, a smart phone, an e-book, a portable multimedia player (PMP), a portable game device, a navigation device, a black box, a digital camera, a 3-dimensional television, a digital audio recorder, a digital audio player, a digital picture recorder, a digital picture player, a digital video recorder, a digital video player, a device capable of transmitting/receiving data in an wireless environment and various electronic devices constituting a home network, one of various electronic devices constituting a computer network, one of various electronic devices constituting a telematics network, a radio-frequency identification (RFID) device, or one of various constituents constituting a computing system.

FIG. 11 is a block diagram illustrating another embodiment of an application of the inventive concept applied to another digital electronic device 4000, according to aspects of the inventive concept. The digital electronic device 4000 including a SoC 150 shown in FIG. 11 may be implemented using an image process device, e.g., a digital camera or a mobile phone or a smart phone with a digital camera.

The digital electronic device 4000 includes a SoC 150, a memory device 401, and a memory controller 402 to control a data processing operation (e.g., write or read operation) of the memory device 401. The digital electronic device 4000 may further include an image sensor 403 and a display 404. The memory device 401 may constitute a memory module.

The input device 401 of the digital electronic device 4000 may be an image sensor. The image sensor 403 converts an optical image into digital signals and transmits the converted digital signals to the SoC 150 or the memory controller 402. The converted digital signals may be displayed through the display 404 or stored in the memory device 401 through the memory controller 402 according to the control of the SoC 150. Data stored in the memory device 401 is displayed through the display 403 according to the control of the SoC 150 or the memory controller 402.

Since the digital electronic device 4000 in FIG. 11 may perform the same operation in the configuration in FIG. 1 or 8 as described in FIG. 7, operation performance of the digital electronic device 4000 may be enhanced.

According to embodiments of the inventive concept described so far, the overall GPU performance is enhanced and power consumption in a data processing system is reduced.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. For example, it is possible to adjust the driving capability of a sub word line driver or adjust the slope of level of applied driving signals by changing, adding, or removing the circuit configuration or arrangement in the drawings without departing from the technical spirit of the present disclosure in other cases.

What is claimed is:

1. A method for caching graphic processing unit (GPU) data in a multimedia processing system, the method comprising:

determining whether a graphics resource to be used in rendering needs to be cached in a system level cache memory, depending on a memory attribute of the graphics resource;

inserting cacheability indicator information into an address translation table descriptor undergoing memory allocation to the graphics resource when the graphics resource needs to be cached;

selectively controlling whether or not to prefetch multimedia data of the graphics resource present in a main memory to the system level cache memory, with reference to the cacheability indicator information during an address translation operation of the GPU;

wherein inserting the cacheability indicator information is performed by a device driver operating in an operating system kernel mode; and limiting a caching operation of prefetching the multimedia data to the system level cache memory when a level 2 (L2) cache hit ratio to the multimedia data of the graphics resource in the GPU is higher than a set value, a performance monitor of the GPU monitoring a shader core, a memory management unit (MMU), and a level 2 (L2) cache memory of the GPU to update in real-time the cacheability indicator information.

2. The method as set forth in claim 1, wherein the memory allocation is one of slab allocation, heap allocation, linear allocation, and coherency allocation.

3. The method as set forth in claim 1, wherein the system level cache memory is shared by a central processing unit (CPU) and a plurality of multimedia image processors (IPs).

4. The method as set forth in claim 1, wherein the graphics resource includes at least one of texture data and geometry data.

5. The method as set forth in claim 1, wherein inserting the cacheability indicator information into the address translation table descriptor is performed for inter-frame unit control in units of frames of the multimedia data.

6. The method as set forth in claim 1, further comprising:
the performance monitor in the GPU periodically monitoring the shader core, the memory management unit, and the GPU L2 cache to check the cache hit ratio.

7. A data processing system, comprising:
a central processing unit (CPU) on which an operating system and a device driver are loaded as programs;
a graphic processing unit (GPU) including a level 2 (L2) cache memory; and
a system level cache memory outside the GPU and shared by the CPU,
wherein the device driver is configured to determine whether a graphics resource to be used in rendering needs to be cached in the system level cache memory, depending on a memory attribute of the graphics resource,
wherein the device driver is configured to insert cacheability indicator information undergoing address allocation to the graphic resource into an address translation table descriptor when a result of the determination is that the graphics resource needs to be cached,
wherein the GPU is configured to selectively control whether or not to prefetch multimedia data of the graphics resource present in a main memory to the system level cache memory, with reference to the cacheability indicator information inserted into the address translation table descriptor when a virtual address of the GPU is translated into a physical address;
wherein the GPU further comprises a performance monitor, a shader core, and a memory management unit configured to check a cache hit ratio of the L2 cache memory and to generate cache control information in response thereto, and
wherein the performance monitor is configured to monitor the shader core, the memory management unit (MMU), and the L2 cache memory to update in real-time the cacheability indicator information.

8. The data processing system as set forth in claim 7, wherein inserting the cacheability indicator information into the address translation table descriptor is performed for intra-frame unit control in a frame of the multimedia data.

9. The data processing system as set forth in claim 8, wherein the performance monitor is configured to monitor the shader core, the memory management unit, and the L2 cache memory in real-time during the intra-frame unit control to prefetch the multimedia data to the system level cache memory when a L2 cache hit ratio of the GPU to the multimedia data of the graphic resource is lower than a set value.

10. The data processing system as set forth in claim 7, wherein inserting the cacheability indicator information into the address translation table descriptor is performed for inter-frame unit control in units of frames of the multimedia data.

11. The data processing system as set forth in claim 10, wherein during the inter-frame unit control, the performance monitor is configured to collect and evaluate information on a counting value and an operating cycle in the GPU obtained after rendering a single frame and to store the collected and evaluated information in a special function register of the GPU, and
wherein during the inter-frame unit control, the device driver referencing the information stored in the special function register is configured to change information of a cacheability attribute descriptor register referenced by the memory management unit before starting to render a next frame.

12. A method of caching graphic processing unit (GPU) data in an apparatus having a multimedia processing system, the method comprising:
providing a central processing unit (CPU), a main memory, and a system level cache (SLC) memory external to a GPU;
a device driver of the CPU initializing cacheability indicator information to a set of control values;
a performance monitor of the GPU monitoring a shader core, a memory management unit (MMU), and a level 2 (L2) cache memory of the GPU to update in real-time the cacheability indicator information; and
the device driver selectively controlling whether or not to prefetch multimedia data of a graphics resource present in the main memory to the SLC memory, based on the cacheability indicator information during an address translation operation of the GPU.

13. The method of claim 12, wherein the CPU, SLC memory, and GPU are components of a system on a chip (SoC).

14. The method of claim 12, further comprising the performance monitor checking a cache hit ratio of the L2 cache memory to update the cacheability indicator information.

15. The method of claim 12, further comprising inserting the cacheability indicator information into an address translation table descriptor undergoing memory allocation to the graphics resource when the graphics resource needs to be cached.

16. The method of claim 15, wherein inserting the cacheability indicator information is performed by the device driver while operating in an operating system kernel mode.

* * * * *